United States Patent [19]

Beckedorff et al.

[11] 4,279,012
[45] Jul. 14, 1981

[54] PROGRAMMABLE APPLIANCE CONTROLLER

[75] Inventors: David L. Beckedorff, Wellesley; Michael Sporer, Harvard, both of Mass.; Bruce R. Watts, Portsmouth, R.I.

[73] Assignee: Massachusetts Microcomputers, Inc., Wellesley, Mass.

[21] Appl. No.: 953,558

[22] Filed: Oct. 23, 1978

[51] Int. Cl.² ............... G06F 15/20; H01H 43/00
[52] U.S. Cl. ..................... 364/104; 307/141.4; 340/147 P; 364/120; 340/309.4; 455/231
[58] Field of Search ............ 364/104, 107, 120, 400, 364/569; 307/39, 41, 141, 141.4; 340/147 P, 147 C, 309.1, 309.4; 328/130, 194, 114, 122; 325/396

[56] References Cited

U.S. PATENT DOCUMENTS

| | | | |
|---|---|---|---|
| 3,440,434 | 4/1969 | Yates et al. | 307/141.4 X |
| 3,774,056 | 11/1973 | Sample et al. | 364/104 X |
| 3,819,906 | 6/1974 | Gould, Jr. | 364/104 X |
| 4,061,927 | 12/1977 | Link | 307/41 |
| 4,071,745 | 1/1978 | Hall | 364/120 X |
| 4,081,754 | 3/1978 | Jackson | 325/396 |

Primary Examiner—Joseph F. Ruggiero

[57] ABSTRACT

Programmable apparatus for providing random on/off control of electrical devices such as appliances. Such control may be programmed for an entire week, with different programming for each day, and with programming control over small blocks of time, e.g. thirty minutes. Programming is secured by the use of a combination or lock and, in addition, the AC line cord of the electrical device, which receives or does not receive AC power depending upon the status of the program, is locked into the apparatus. During operation, the program in the apparatus may be interrogated and displayed; otherwise the time of day is displayed. The apparatus also includes a look-ahead feature, turning on an appliance, such as a television set, earlier than programmed in order to provide sufficient warm-up time.

44 Claims, 12 Drawing Figures

PROGRAMMABLE APPLIANCE CONTROLLER

BACKGROUND OF THE INVENTION

The present invention generally relates to controller devices and more particularly to a programmable controller for electrical devices such as appliances.

Controllers for electrical devices such as appliances have in one of their simplest forms included timers which plug into the AC line power source, with the appliance, such as a light, radio, coffee pot, etc., plugging into the timer. The timer includes a motor which causes a 24-hour dial to rotate, making one full revolution per day, turning the appliance on and then off once per day. More recently, such timers have been provided with either a turn on or turn off capability once per hour. So-called clock-radios have also been provided with this turn on/turn off capability integrated therein.

More sophisticated appliance controllers than the above-noted timers have also been developed in the past. One such controller is described in U.S. Pat. No. 3,577,004. This controller or programmed clock timer is provided with the capability to operate an alarm and an appliance on an adjustable 24-hour sequence which is supplemented with selectively programmed 24-hour and 7-day timing sequences. In such manner, one or more appliances may be operated according to a predetermined program, which is visibly presented on a control panel with individual incremental time segments being programmed by an array of manually operated push-pull switches.

Controllers of varying complexity and specific uses may also be seen from U.S. Pat. Nos. 3,965,366; 3,840,752 and 4,035,661. In addition, other controllers which have appeared in various newspaper or magazine articles for use with, for example, television sets, which controllers are not necessarily included in the "prior" art, include a programmable television set offered by Heathkit Corporation, a programmable television set which will apparently be offered in the near future by Sharp Corporation, and a television controller which will apparently be marketed under the trade name, Video Proctor, which was the subject of an article in the Jan. 20, 1978 issue of *New York Tribune* newspaper (also see the Mar. 1978 issue of *Consumer Electronics* magazine).

Some of the above-mentioned controllers have been developed, as has the apparatus of the present invention, based on the rising concern about the quality of television programming, TV violence, and increasing concern about TV addiction among children. Thus, a convenient, low-cost way to regulate the amount and type of TV programs would help to alleviate such concerns. In addition to the use of such controller for regulating television usage, it is also important to control other electrical devices such as common household appliances, including lights, radio, toaster, tape recorders, video tape recorders, etc. Additionally, such controller should have the capability to turn such appliance on and off at completely random times for use, for example, as a security timer.

For many of the above-noted applications, the controller must be able to be locked, i.e., the programming of the on/off sequences should not be alterable without a key or combination under the control of an authorized operator. Further, for convenience, the controller should be useable without the need for the services of, for example, a TV repairman to install the controller. In addition, the steps required to program the controller should be as simple and straight-forward as possible.

It is accordingly the primary object of the present invention to provide a programmable appliance controller which is convenient and easy to use.

SUMMARY OF THE INVENTION

The objects of the present invention are achieved by providing controller apparatus for controlling the operation of a device, which apparatus includes a switch, which switch includes a control input, a source input and a source output. First and second apparatus for respectively coupling the source output to the device and the source input to an energy source are also provided. The control input is coupled to receive a control signal, the presence of which enables the coupling of the energy source from the source input to the source output. Apparatus for generating the control signal is also provided and includes apparatus for providing the current time of day, storage apparatus for storing information indicative of at least one period of time during which the control signal is to be generated and apparatus, responsive to the current time of day and the information stored in the storage apparatus, for enabling the generation of the control signal.

BRIEF DESCRIPTION OF THE DRAWINGS

For a full understanding of the nature and objectives of the present invention, reference should be had to the following detailed description, taken in connection with the accompanying drawings, in which.

DETAILED DESCRIPTION OF THE PREFERRED EMBODIMENT(S)

Figure 1:
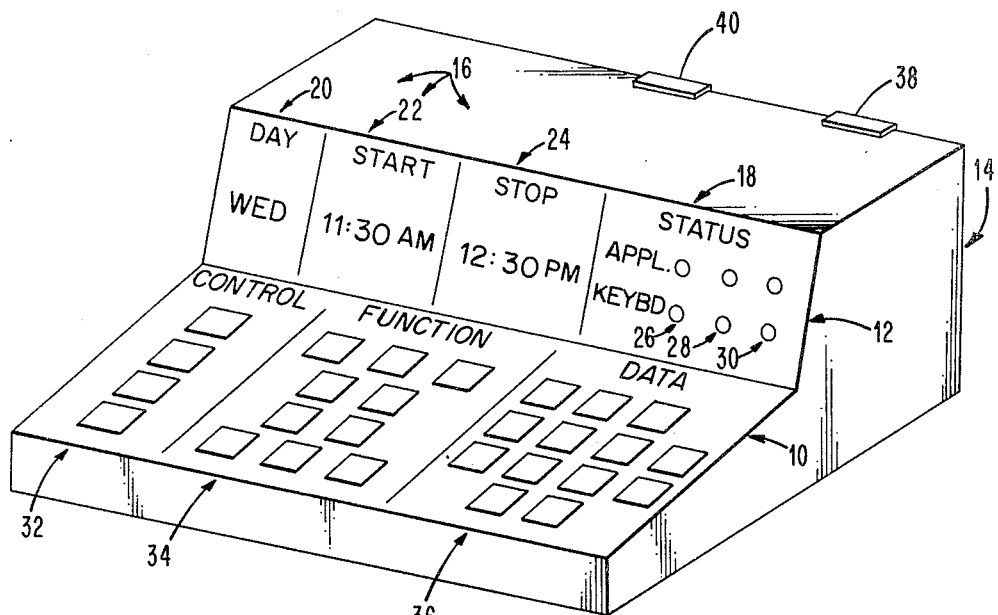
FIG. 1 is a perspective view of the controller of the present invention.
Figure 2:
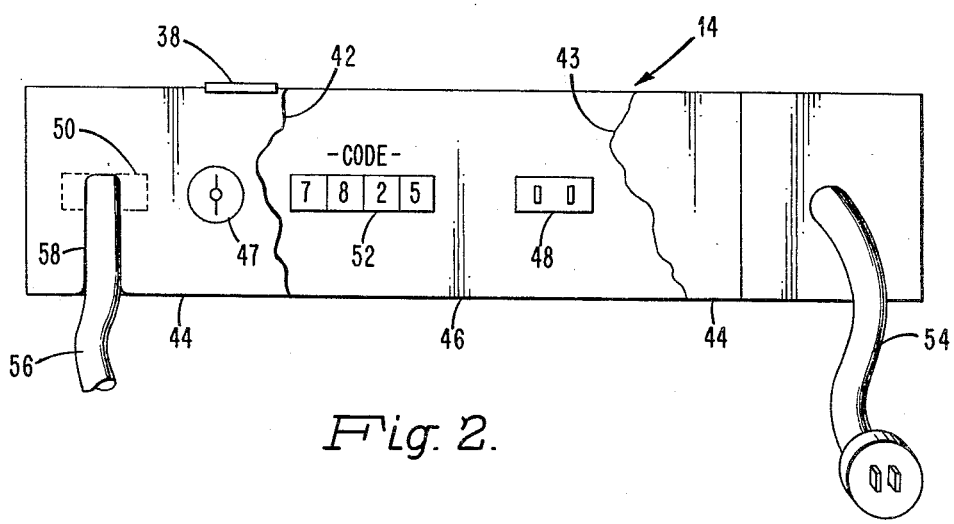
FIG. 2 is a view of the back panel and cover of the controller of the present invention.

The programmable appliance controller of the present invention is shown in FIGS. 1 and 2. FIG. 1 illustrates the keyboard 10 and the display 12. FIG. 2 illustrates the back panel and cover 14. The controller may be programmed by use of the keyboard 10 to control one or more appliances for a full week cycle. The programming information, as well as the time of day, may be displayed on display 12. As will be seen, the controller provides a means to control each half-hour interval within a one-week time period, although it should be understood that such half-hour interval may be decreased (or increased) by use of more (or less) memory storage as shall be discussed. The controller thus allows on/off control of such appliances as television sets, videotape recorders, radios, hi-fi equipment, lights, etc. automatically by use of a program preset into the controller. As desired, the controller may be reprogrammed at any time. Further, after the program has been entered, the controller, i.e., the keyboard 10 (i.e., the ability to enter programs using the keyboard) may be locked by use of a combination so that no unauthorized changes may be made to the program.

The display 12 of the controller as shown in FIG. 1 includes a time field 16 and a status field 18. The time field 16 includes three subfields: day 20, start 22 and stop 24. The day field 20 indicates the day of the week while the start and stop fields indicate the time an appliance will be on. The AM/PM designation is provided with each start and stop time. These start and stop times change depending on the program. For example, in a given day there may be several start and stop times. As shall be seen, the controller also displays the time of day. The day of week and time of day are displayed in respectively the day subfield 20 and the start subfield 22, and when so displayed, the stop subfield 24 is left blank.

The status field 18 includes information about the appliance(s) being controlled as well as the keyboard. The status is indicated by use of the display for subfields 26, 28 and 30 for both appliance and keyboard. For appliance status, if subfield 26 is lit, this means that it is operable and under program control; if subfield 28 is lit, this means that the appliance is not operable (because the program calls for it to be off), but is under program control; and if subfield 30 is lit, this means normal operation with no program control. If the on/off control of the appliance is in the on position, the appliance will actually switch on and off according to the program in the controller. If the on/off control is in the off position, only subfields 26 and 28 in the status field 18 will switch on and off according to the program; however, when field 26 is lit, the appliance may be turned on by use of the on/off control thereof.

For keyboard status, if subfield 26 is lit, this means it is unlocked and that data can be entered; if subfield 28 is lit, this means the keyboard is locked and that the combination or code must be entered by use of the keyboard to unlock the keyboard; and if subfield 30 is lit, this means that a keyboard error has been made. The total number of display positions may thus, by way of example, include twelve display positions.

The keyboard 10 is shown to include three sections or groups of keys: the control keys 32, the function keys 34, and the data keys 36. The control keys are used to lock and unlock the keyboard 10, and to begin and end program control. The keys which may be used, some of which will be referred to hereinafter, are: Unlock Keyboard, Lock Keyboard, Begin Program and End Program.

The function keys are used in conjunction with the data keys to specify days, start times, and stop times. They are also used to store and review time ranges, to set and display the controller's clock (time of day), and to clear memory and errors. The ten keys which may be used in the function section are: day, start, stop, store, review, set time, display time, clear memory, clear day, and clear error.

The data keys are used to specify a particular day of the week or a particular time. Keys used in this field may include: 1/MON (i.e., 1 or Monday), 2/TUE, 3/WED, 4/THU, 5/FRI, 6/SAT, 7/SUN, 8, 9, 0, full colon, AM and PM.

As shown in FIG. 1, hinges 38 and 40 are used, and as shown in FIG. 2, such hinges are used (only hinge 38 is shown because of the breakaway 42 and 43) to hold a lockable back cover 44 which, by use of a key lock 47, serves to lock the back cover 44 over that portion of backplate 46 which includes AC power sockets 48 and 50 and combination (code) switches 52. The controller of the present invention is used to control the availability of power to the sockets 48 and 50 to which an appliance may be connected. As shown, up to two appliances may be controlled at the same time; however, it should be understood that by the use of additional sockets, additional appliances may be controlled. The controller receives its AC power via line cord 54 which is plugged into an AC wall outlet.

As stated, the line cord of the appliance to be controlled is, with back cover 44 unlocked and moved out of the way by rotation about its hinged edge, plugged into one of the sockets which is itself recessed, or with the backplate, or portion thereof, is recessed to accommodate the size of the appliance's line plug, thereby allowing the back cover to be placed in its proper position and locked. In doing so, only the line cord 56 of the appliance remains outside the back cover through the accommodating slot 58, with the plug of such line cord 56 secured into the socket 50.

Also included on the back plate 46 and lockable by back cover 44, is a switch 52, which may, by way of example, include four positions. The authorized operator of the controller (usually a parent when the controller is used to regulate the children's television viewing) sets a four digit secret code which will be inaccessible and hidden from view (i.e., locked) when the back cover 44 is secured in place. Thus, the operator must remember this number to unlock the keyboard to enter a program, which unlocking is done simply by pressing the Unlock Keyboard key and depressing the secret code or combination. Of course, if the operator forgets the code, he need simply unlock the back cover 44 and look at the switch 52. The code set in by switch 52 (code 7825 is shown in FIG. 2) may be reset at any time, for example, if the children break the code.

By way of example, the operation of the controller by an operator shall now be discussed. Suppose the operator desires that his television set be operable each weekday between the hours of 7:00 A.M. to 8:00 A.M., 6:00 P.M. to 7:30 P.M., and 9:00 P.M. to 11:30 P.M. The operator first insures that the controller is no longer under program control. This is done by pressing the End Program key, following which the controller's memory storage is cleared by use of the Clear Memory key. The following sequence of keystrokes is then entered: Start, 7:00 A.M., Stop, 8:00 A.M., Day, Mon., Store, Day, Tue., Store, Day, Wed., Store, Day, Thu., Store, Day, Fri., Store. The time range need not be reentered for each day since the Store key does not erase the information already keyed in. The next time range (6:00 P.M. to 7:30 P.M.) is entered in a similar fashion (the only change from the above sequence is that 7:00 A.M. is replaced by 6:00 P.M. and 8:00 A.M. by 7:30 P.M.). The next time range is programmed in exactly the same manner. Once all ranges have been entered, the appliance may be placed under program control by use of the Begin Program key. It should be understood that there is virtually no limit to the number of program ranges in each day, the only limitation being dictated by the length of the programmable intervals, e.g., thirty minutes. Thus the controller could be, by way of example, turned on and off every half hour. It should also be understood that the time ranges may be different for each day. For example, on weekends, a time range during the afternoon may be programmed for viewing of sports programs.

Figure 3:
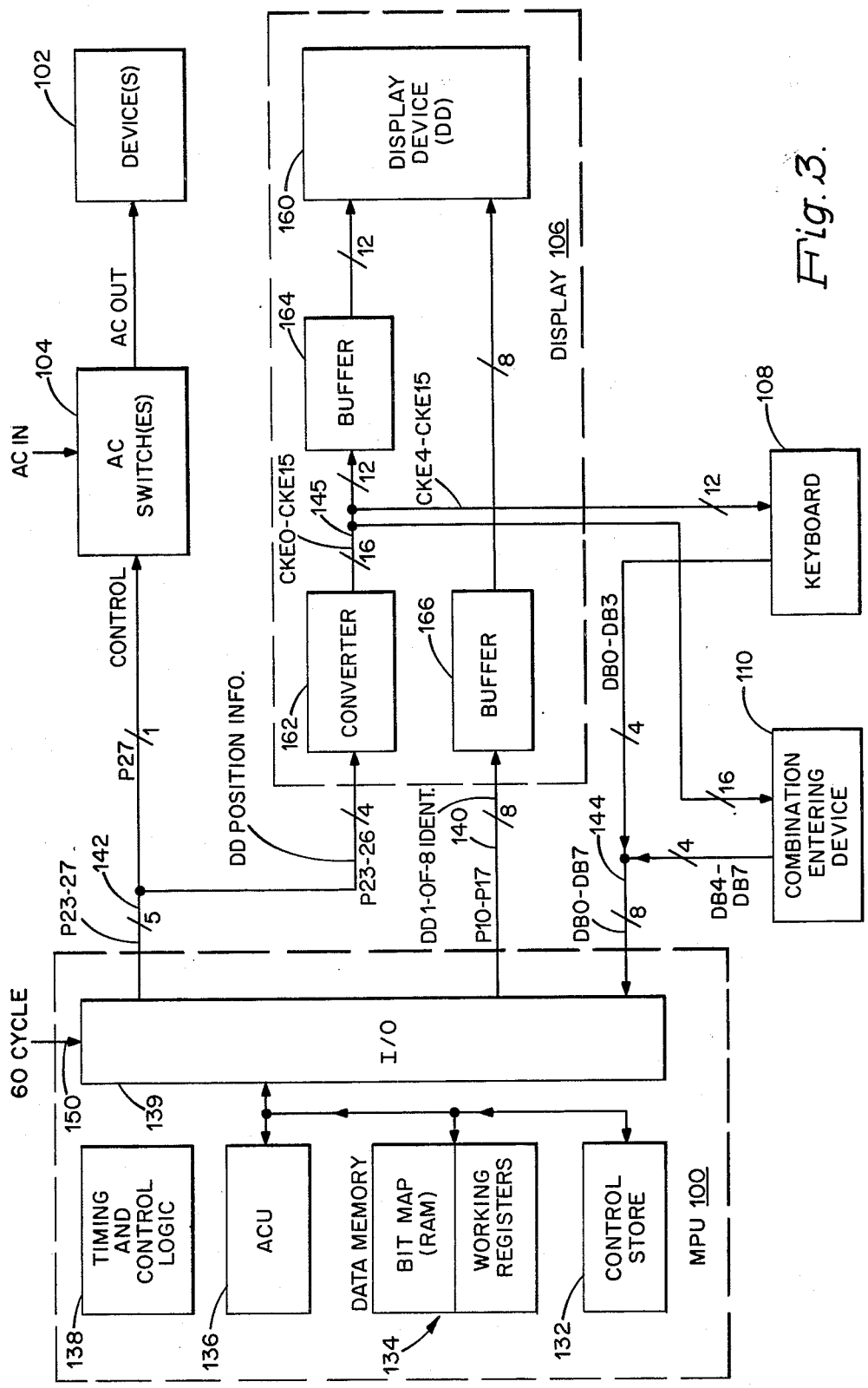
FIG. 3 is a logic block diagram of the controller of the present invention.

A logic block diagram of the apparatus of the present invention is shown in FIG. 3. Such apparatus or controller includes five major units: the microprocessing unit (MPU) 100, a device control unit, or AC switch 104, the display 106, the keyboard 108 and the combination entering device 110. Such apparatus is coupled to control one or more appliances or devices 102. The apparatus would also include a power supply, not shown, for providing the necessary power to such units. As shown, the AC switch 104 is coupled to receive the AC line input (AC IN) directly and the MPU 100 is coupled to receive a 60 Hertz (cycle) signal which may be derived from the AC line input frequency. Where 60 Hertz is not the AC line frequency (for example, it may be 50 Hertz), a frequency conversion is required. Each such unit and its function shall now be described.

The MPU 100 may be, for example, that microprocessor electronic chip model number 8049 manufactured by Intel Corporation and described in Intel publication document number 98-270C, dated January, 1978, and entitled "MCS-48 Family of Single Chip Microcomputers User's Manual." The MPU includes five major functions including: a control store 132, a data memory 134, an arithmetic computation unit (ACU) 136, a timing and control unit 138, and an input/output unit (I/O) 139. The MPU 100 executes sequences of control firmware instructions. The particular sequence thereof is determined by the MPU based on information obtained from the other units. The MPU affects the other units by transmitting information to them based on the particular control firmware instructions. The MPU has an internal cycle time (the time to perform the function specified by a control firmware instruction). An external circuit, not shown, but consisting of an inductor and 2 capacitors, is used in conjunction with circuits within the MPU to determine the internal cycle time. In addition, the MPU keeps track of the time of day in much the same way as an electronic digital clock. As such, a signal on line 150 is provided which is derived from the AC line signal. This signal is cyclic, repeating its pattern 60 times per second. The MPU keeps track of the time of day by counting occurrences of this signal. After a count of 60 is reached, the microcomputer senses that 1 second of time has elapsed. The MPU 100 exchanges information with the other components over lines 140, 142, and 144. The MPU sends information to the units using lines 140 and 142 and receives information from units 108 and 110 using lines 144. Lines 140 include eight lines P10-P17. Lines 142 include five of eight possible lines. The five lines are noted as P23-27, with one line, P27, coupled to the control input of switch(es) 104 and with four lines (P23-P26) coupled with converter 162. Lines 144 include eight lines (DB0-DB7) with four lines (DB0-DB3) received from keyboard 108 and the other four lines (DB4-DB7) received from combination entering device 110.

The AC switch 104 includes one or more mechanism's, for example, a solid state relay, triac or microswitch which will control one or more devices requiring line power. The control line 142 coupled to control switch 104, enables or disables the connection of the AC IN line to the AC OUT line, thereby energizing or de-energizing the connected devices 102. One switch would be used for each of the devices 102 with control line 142 being used, in parallel, to control each such switch. However, it should be understood that only one such switch need be used independent of the number of devices 102 connected for control so long as such switch can handle the power requirements of the devices.

The display unit 106 has two primary functions, both of which have to do with communicating information from the MPU 100 to the operator. The display 106 may include several display devices (DD) 160. Devices 160 may, by way of example, be light emitting diodes (LEDs), several for each position of display, which positions are organized in a multiplexed display configuration. This means that each display position of which there are, for example and as has been seen, twelve, requires two pieces of information in order for the LEDs at each position to be illuminated. The MPU 100 provides these two pieces of information in a rotating manner so that first one position is activated, then the next, and so forth until all have been activated. The rotation then commences anew with the first position. The first piece of information identifies the position to be activated (when one position is activated, all others are dormant and will not be energized; however, the display appears continuous to the human eye due to the integration properties of the eye which allows a person to view, for example, television images as continuous images while in reality there are discrete frames being displayed). The second identifies which of eight possible LED's in a given position are to be illuminated.

The eight possible LEDs are set in a physical orientation such that three horizontal bars and four vertical bars can be used to display alphanumeric information with the eighth position being the decimal point which is not needed for the display of the controller of the present invention. Actually, and with brief reference to FIG. 6, only the hour and minute positions (a total of 8) use up to eight possible LEDs. The other positions, for example AM/PM are LEDs which have either AM or PM lit. The same is true for the day field, i.e., either MON or TUE or WED, etc. is lit. The status field may include 6 LEDs or simply six light bulbs, one for each position.

The MPU applies the position identifier on line 142. Ths is processed by converter 162 and buffer 164 and then sent to the display device 160. Buffer 64 provides electrical buffering to insure that the display has the proper current and voltage to illuminate the specified LEDs.

Converter 162 converts the information from one encoding scheme to another. The first scheme, called binary-coded, is used by the MPU so as to minimize the interconnections between units 100 and 106. In this encoding, any number between 0 and 15 can be represented using the four signal lines (P23-26) of line 142. Converter 162 converts this to a linear-coding scheme wherein only one of the 16 lines (CKE0-CKE15), (only 12 lines (CKE4-CKE15) are received by buffer 164 and keyboard 108) of lines 145, which wire corresponds to the number specified by the MPU is activated. For example, suppose that the MPU wants to illuminate LED position 7. The binary-coded version of this, 0111, is presented on line 142. Converter 162 converts this so that the appropriate line of lines 145 is activated. When buffered by buffer 164, this will permit LED's at position 7 to be activated. The second piece of information, which of the eight available LED's at a given display position are to be illuminated, is provided by the MPU on line 140. This is buffered by buffer 166 and sent to the display device 160. The MPU holds the information on lines 140 for a period of time. This time is sufficient to insure that the individual LED's will be illuminated and seen by the operator. The buffers 164 and 166 may be those manufacture by Texas Instruments, Inc. having part numbers 7407 and 75491 respectively, whereas converter 162 may include that device having part number 74154.

As mentioned above, the MPU uses the display to communicate two types of information to the operator. In the first mode, the operator is entering the programming information into the apparatus of the present invention with the intention of establishing a schedule for automatic operation of the connected device(s). This mode is also used to review the programming information previously entered into the invention. In this programming mode of operation, the display will show the day of the week, the time that the controlled device(s) is to be turned on, and the time that it is to be turned off. The MPU has an internal table, hereinafter referred to as the Bit-Map, which is included in its internal data memory 134 which determines when the controlled devices are to be activated or turned off. The second piece of information will be displayed when the invention is not being programmed. It will commence when instructed to do so by the operator, or in any case 60 seconds after the last command given by the operator. In this second mode of operation, the current day of the week and the current time will be displayed.

The keyboard 108 is used to enter programming information into the apparatus of the present invention. It is also used to set the proper day of the week and current time. The keyboard may, by way of example, be a matrix-type keyboard with, for example, forty-eight positions. However, for purposes of the present invention, only some of these keys are actually used and, in fact, the key positions which are not used, may not have actual keys (see FIG. 1) or such keys may not be made accessible to the operator. With such matrix-type keyboard, it may include twelve columns and four rows. When a key is depressed, a connection is established between the column and the row under the key. The MPU 10 periodically scans the keyboard and senses when a key is depressed. The MPU activates each of the twelve columns and senses the four rows at each activation. When a key is depressed, the keyboard will transfer the activation signal from the active column to the connected row. Thus the MPU will sense which key has been depressed. The MPU will activate each of the twelve columns by using the converter 162 described hereinabove. It will activate each line CKE4-CKE15 while it senses the rows on lines DB0-DB3.

The combination entering device 110 is used to establish the key or "combination" (lock information) which must be entered by the operator at the keyboard 108 prior to the commencement of the programming of the apparatus of the present invention by an operator. This combination or lock is designed to be secure to prevent unauthorized use of the apparatus of the present invention. Device 110 may include several switches, such as, but not limited to, so-called thumbwheel switches or, for example, microswitches manufactured by Eeco Corporation. The characteristics of device 110 are similar to those of keyboard 108. Thus the MPU scans each of the plurality of switches included in device 110 by use of lines CKE0-CKE15 and senses the position of the corresponding switch on lines DB4-DB7.

The data memory is contained within the MPU. It is used to store information which the MPU will need at a later time. The data memory, by way of example, is comprised of 128 bytes of storage. A byte is composed of 8 binary digits (bits) and can be used to hold a number which ranges from 0 to 255. Also, a byte may be thought of as containing a pattern of 8 bits which are not interpreted to represent a number. As an example, the time-of-day buffer (described hereinafter) will contain the binary pattern 00001010 to indicate that the time lies between 12:00 Midnight and 12:00 Noon. The major sections which hold different types of information will now be described.

Figure 4:
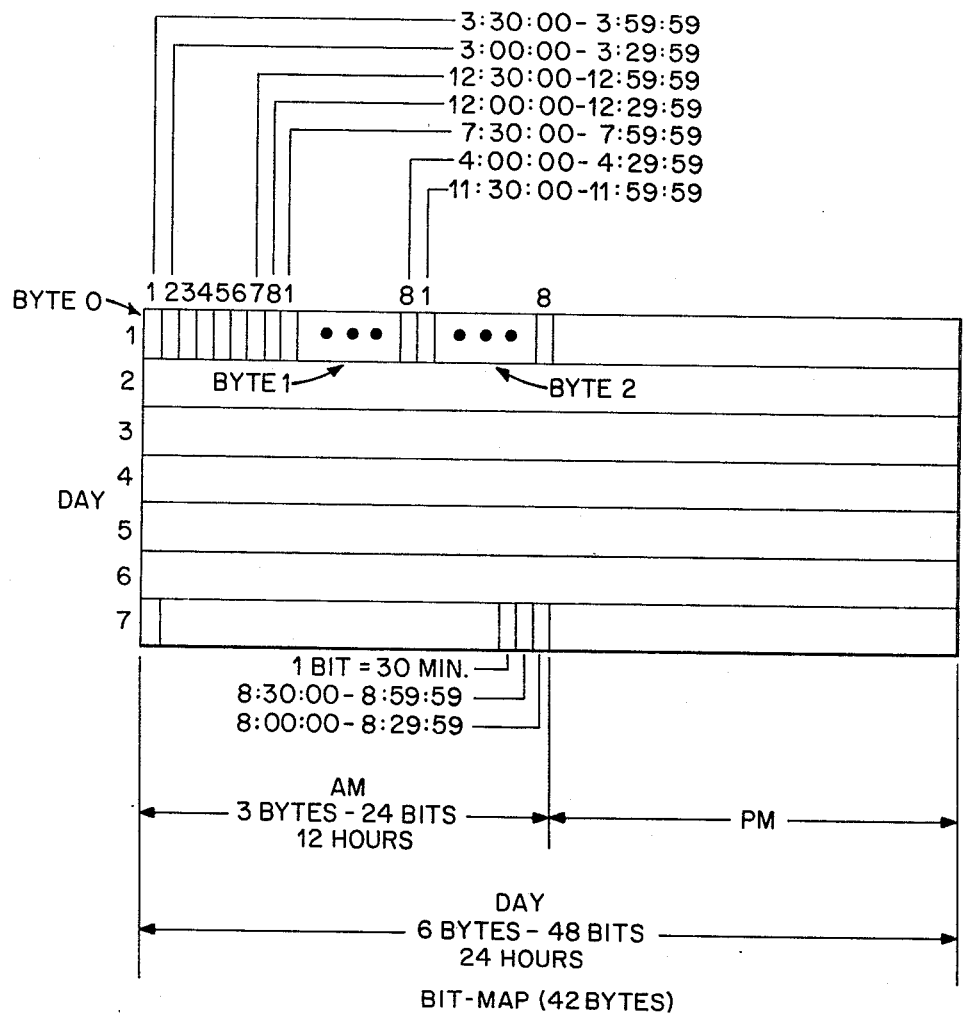
FIG. 4 illustrates the manner in which program information is stored for use in controlling the operation of the apparatus of the present invention.

The Bit Map, shown in FIG. 4, is a data buffer which, by way of illustration for one embodiment, includes 42 bytes. The information that it contains is interpreted as the control program for the connected devices. Thus when the operator enters a program for the control of the connected devices, the MPU will sequence through the control firmware and change the values of one or more bytes within the Bit Map. During normal running, the MPU will use the current time-of-day to identify a portion of the Bit Map that is to be examined. The Bit Map will contain a datum at the examined portion which will indicate whether the connected devices are to be turned on or off. The Bit Map is not considered to contain numeric information. It is considered to contain a sequence of 1's, each of which occupies one bit position. Each bit will indicate that the connected devices are to be turned on or off for a given 30-minute period. For example, if the connected device is to be turned on at 12:00 A.M. on Monday, then the bit which represents this time period will be set to a one when the controller is programmed. When the time-of-day reaches 12:00 A.M. on Monday, the MPU will examine the corresponding bit. Upon finding the bit a 1, the MPU will instruct the proper circuitry to turn the connected device on. For the example given (12:00 A.M. on Monday), the bit which represents this time period is the eighth bit of byte 0 in the Bit Map.

The manner in which the byte and bit to be examined are found is discussed hereinafter. However, as can be seen from FIG. 4, there are 7 days represented with day 1 being Monday and with the 24 hours in each day represented by 6 bytes (48 bits). If the first byte in day 1 is designated as byte 0, then 11:30 A.M. on Sunday (day 7), is the first bit of byte 38 (the 39th byte). Thus, as can be seen for day 1, the last bit of each byte represents the first thirty minutes of the four-hour time frame of the byte, etc., with the first bit representing the last thirty minutes of such time frame. This is done to simplify the calculation for the bit which is to be examined as discussed hereinafter. It should be understood that the Bit-Map may have included more than 42 bytes. For example, to one extreme, each bit could have been set to designate a one-minute (or even one-second) time interval. For example, if each bit were allowed to represent fifteen minutes (rather than thirty minutes as discussed above), then the Bit-Map would have included 84 bytes rather than 42 bytes.

Figure 5:
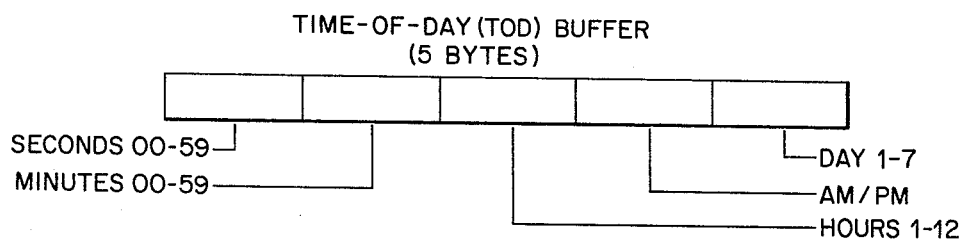
FIG. 5 illustrates the time of day buffer used in the controller of the present invention.

The Time-of-Day buffer shown in FIG. 5 includes 5 bytes which hold the current time. The time is set under control of the operator. Once the operator has set the time, it will be entered into the Time-of-Day buffer. Each time the MPU senses that one second of time has elapsed, the time if brought up to date. The first byte will contain a number which is interpreted to represent seconds (00 to 59). The next byte will contain the minutes indicator (00 to 59). The third will contain the hours (1 to 12). The fourth contains a specified bit pattern (00001010) if the current time is A.M. while it contains another pattern (00001011) if the current time is P.M. The final byte holds the day where 1 represents Monday, 2 represents Tuesday, and so on until 7 represents Sunday.

Figures 6, 12:
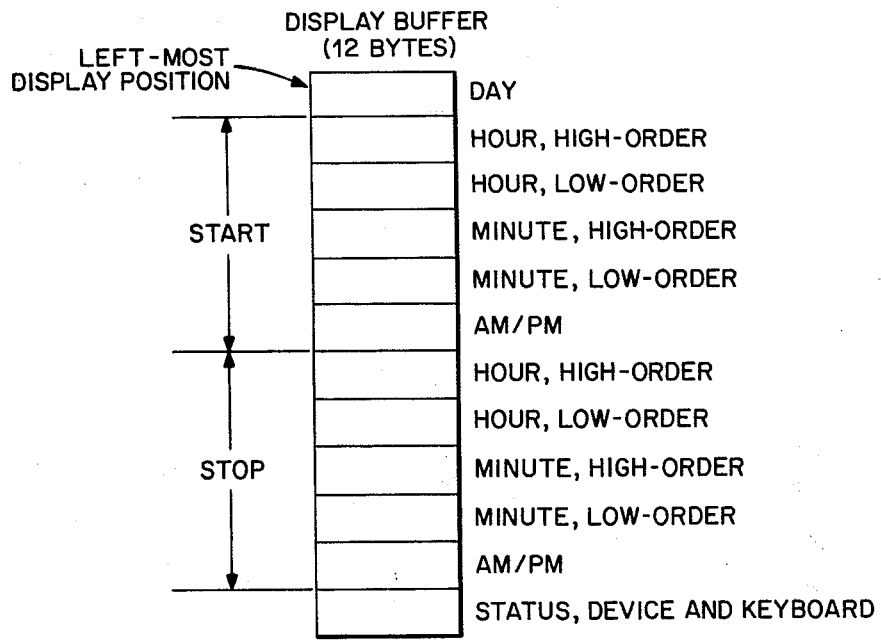
FIG. 6 illustrates the display buffer used in the controller of the present invention.
FIG. 12 is an alternative manner for storing program information for use in controlling the operation of the apparatus of the present invention.

The display buffer shown in FIG. 6 includes, by way of example, 12 bytes of storage, one for each item of information to be displayed. Each byte contains a number which is used as a pointer into a conversion table which is included in the control store. This table contains a bit pattern at each entry which indicates which segments of each display position are to be activated to illuminate the corresponding entry. For example, the conversion table contains a binary 11111110 in the entry that indicates that the number 8 has the first 7 segments (but not the decimal point) illuminated. Each of the values in the display buffer will be examined when the display is being activated and used to obtain the corresponding conversion table entry. The high-order bit (left-most) of a display buffer entry is set to a 1 to indicate that the low-order (right-most), by way of example, 6 bits contain a valid entry to be displayed. This is useful to distinguish a blank display entry from one containing the number 0.

The display buffer is shown to include a left-most and a right-most position which corresponds to their physical position on the front display panel as shown in FIG. 1. Both the start and stop information are shown. Common to both are the hour-high order and low order information, e.g., for 12 o'clock, hour-high order is 1 and hour-low order is 2. The same is true for the minute-high order and low order information. A.M. or P.M. is also displayed for both the start and stop information. The day and status information are also displayed.

The remaining data locations of the data memory are used to store various pieces of information during the operation of the controller of the present invention. Such information includes flags, tables and other information which is used during the operation of the present invention. The description of the various firmware sequences will expand on the use of such information.

Figure 7:
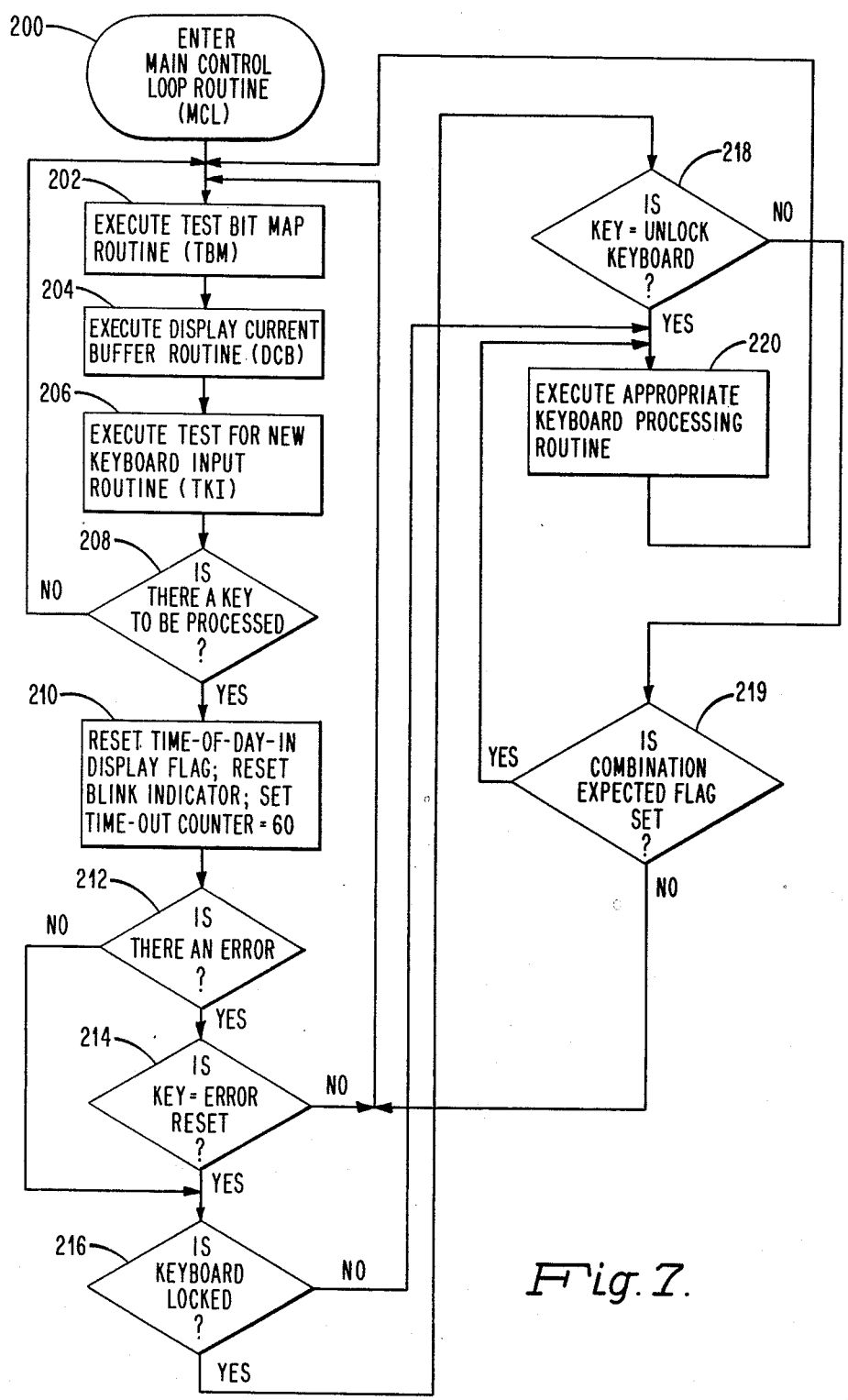
FIG. 7 is a flow diagram of the firmware for the main control loop routine of the controller of the present invention.

The Main Control Loop routine (MCL) is shown by the flow diagram of FIG. 7. The MCL is executed repeatedly. It directs the execution of other various routines and is analogous to a traffic director. The MCL is entered at block 200, following which the Execute Test Bit Map routine (TBM) 202 (see FIG. 8) is executed; the Display Current Buffer routine (DCB) 204 (see FIG. 9) is executed; and then the Test for New Keyboard Input routine (TKI) 206 (see FIG. 10) is executed. If there is no key depressed and thus no keyboard input to be processed then as indicated by test block 208, TBM 202 is again entered. Otherwise, after the housekeeping functions indicated in block 210 are processed, block 212 is entered. If the keyboard is unlocked and there is no error condition, the key that was depressed is processed by the appropriate keyboard processing routine as shown in block 220. If there is an error condition, as indicated by block 212, only an input from the Clear Error key is accepted as shown in block 214. Otherwise, the TBM 202 is again executed. A determination is made as indicated by block 216 as to whether the keyboard is locked. Block 216 is entered by either a YES answer from block 214 or a NO answer from block 212. If the keyboard is not locked, the appropriate keyboard processing routine is executed (block 220). If the keyboard is locked, block 218 is entered and a determination is made as to whether unlock keyboard is the key input. If not, block 219 is entered and a determination is made as to whether the combination expected flag is set. If NO, then block 202 is again entered. If YES from block 219 or from block 218, then the appropriate keyboard processing routine is executed as indicated by block 220. After executing the appropriate keyboard processing routine, the MCL is again processed by beginning the execution of block 202.

Figure 8:
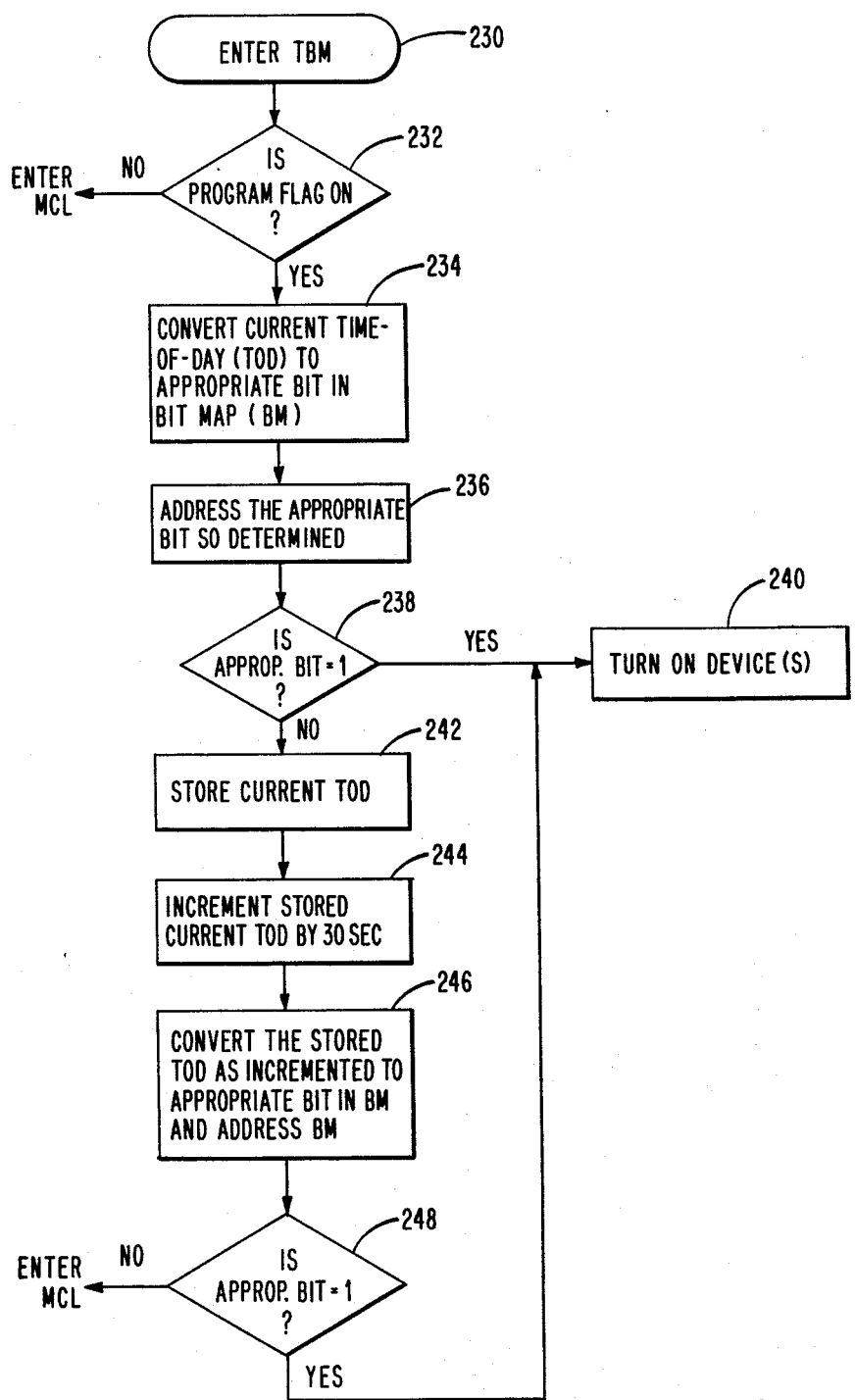
FIG. 8 is a flow diagram of the firmware for the test bit map routine of the controller of the present invention.

A flow diagram of the Test Bit Map routine (TBM) is shown in FIG. 8. The TBM causes the Bit-Map (BM) to be examined once per cycle of the MCL. After TBM is entered (block 230), a determination is made as to whether the program flag is on (block 232). The program flag is turned on and off by respective keys therefor included in the keyboard. If the program flag is off, the MCL is again entered. If the program flag is on, the current time of day (TOD) is converted to the appropriate bit in the Bit-Map (BM) and such bit is addressed as indicated in blocks 234 and 236. The manner in which such conversion takes place is explained elsewhere herein. If the bit addressed is a binary one, the devices are turned on as indicated by block 240. If, on the other hand, the answer from decision block 238 is NO, the current TOD is stored in a temporary location of the local memory (block 242) and the value of the current TOD is incremented by thirty (30) seconds thereby looking ahead to see if a device should be turned on a little early (for example, thirty seconds) to allow a device such as a television set to warm up. Following the step of so converting and addressing as indicated by block 246, if this new bit, which is representative of such thirty-second increment from the current TOD, is a binary zero, the MCL is again entered (block 248). Otherwise, if a binary one, the device(s) is turned on (block 240).

The following description will show how the current time of day is converted to point to the appropriate bit in the Bit-Map (see block 234 of FIG. 8) by use of the arithmetic unit in the MPU. The appropriate byte in the Bit-Map is determined by use of the following formula:

$$BP = (DAY-1)*6 + PM*3 + MOD(HOUR, 12)/4$$

where:
BP is byte pointer;
DAY is the current day;
PM is 1 if current time is PM; and
MOD is the modulus function, i.e., MOD (hour, 12)/4 means use 0 if hour is 12, otherwise use the hour and then integer divide by 4. By way of example, the byte in which 11:30 A.M. of the 7th day is located is determined as follows:

$(7-1)*6+0*3+11/4$; or $36+0+2=38.$

The answer is byte 38 (assuming the first byte is byte 0).

To determine the particular bit in the byte above determined, the following formula is used:

$BM = M.LS. (MOD (MOD (HOUR, 12), 4) *2)$ where:
BM = Bit Mask;
M = 1 if minute is 0-29;
M = 2 if minute is 30-59;
MOD (MOD (HOUR, 12), 4) = 0 if Hour = 4, 8 or 12,
MOD (MOD (HOUR, 12), 4) = 1 if Hour = 1, 5 or 9,
MOD (MOD (HOUR, 12), 4) = 2 if Hour = 2, 6, or 10, and
MOD (MOD (HOUR, 12), 4) = 3 if Hour = 3, 7, or 11; and
M.L.S. = left shift of M by the MOD number Thus, by the above example, BM would be calculated as follows:

```
BM - 2.LS. (MOD(MOD(11,12),4)*2
   = 2.LS. (3*2)
   = 2.LS. 6
   = binary 10000000
```

Thus, the bit is indicated by the binary one which by this example is in the left most position. This correlates with the bits shown in the Bit-Map of FIG. 4.

Figure 9:
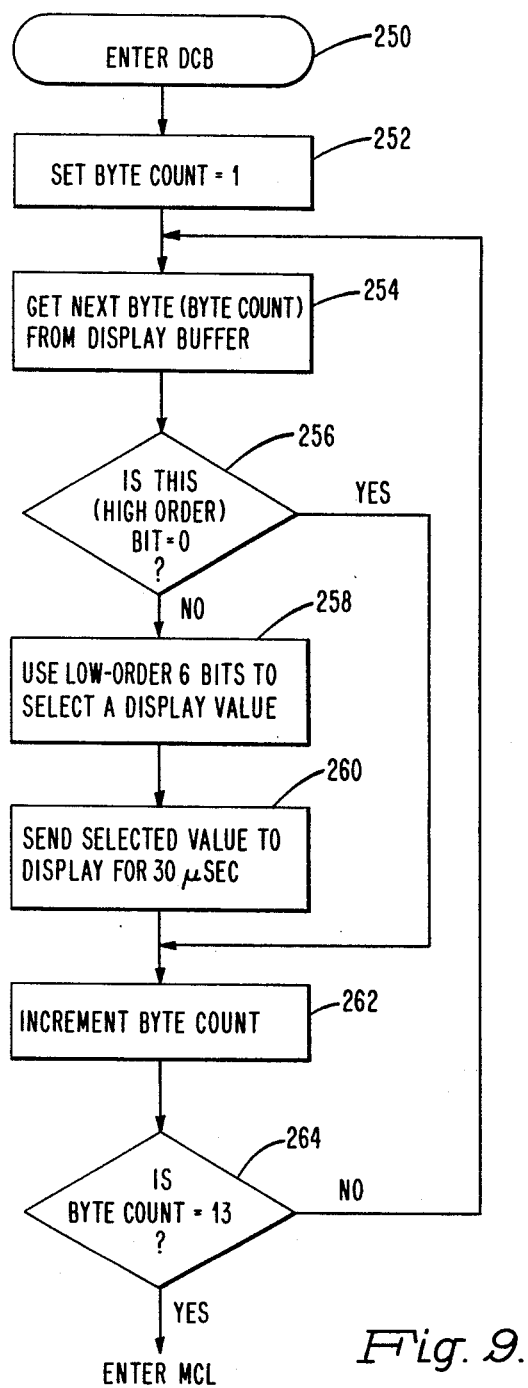
FIG. 9 is a flow diagram of the firmware for the display current buffer routine of the controller of the present invention.

The Display Current Buffer routine (DCB) as shown in FIG. 9 is entered at block 250. This routine is used to display the contents of the display buffer shown in FIG. 6. Each byte of the display buffer is examined. If the high order bit is a binary zero, the current byte will not be displayed and the routine will proceed to the next byte. If the high-order bit is a binary one, the low-order six bits specify the information that is to be displayed. These six bits are used to obtain a value in a conversion table which is stored in the control store. Such value represents the segments of the display position to be illuminated. Thus, after initially setting the byte count to equal one (block 252), such byte indicated by the byte count is fetched (block 254) and as shown by block 256, either the byte count is incremented (block 262) or the low order six bits of such byte are used to select a display value (block 258). Such value is used for the display to the operator for a short period of time. After incrementing the byte count, a determination is made to see if all twelve bytes have been examined and displayed as appropriate. Thus, if the byte count equals thirteen (block 264), then all such bytes have been so scanned and the MCL is again entered. If not all bytes have been so scanned, block 254 is again entered and the display information in the next byte is displayed as appropriate. The process continues until all bytes have been displayed as appropriate.

Figure 10:
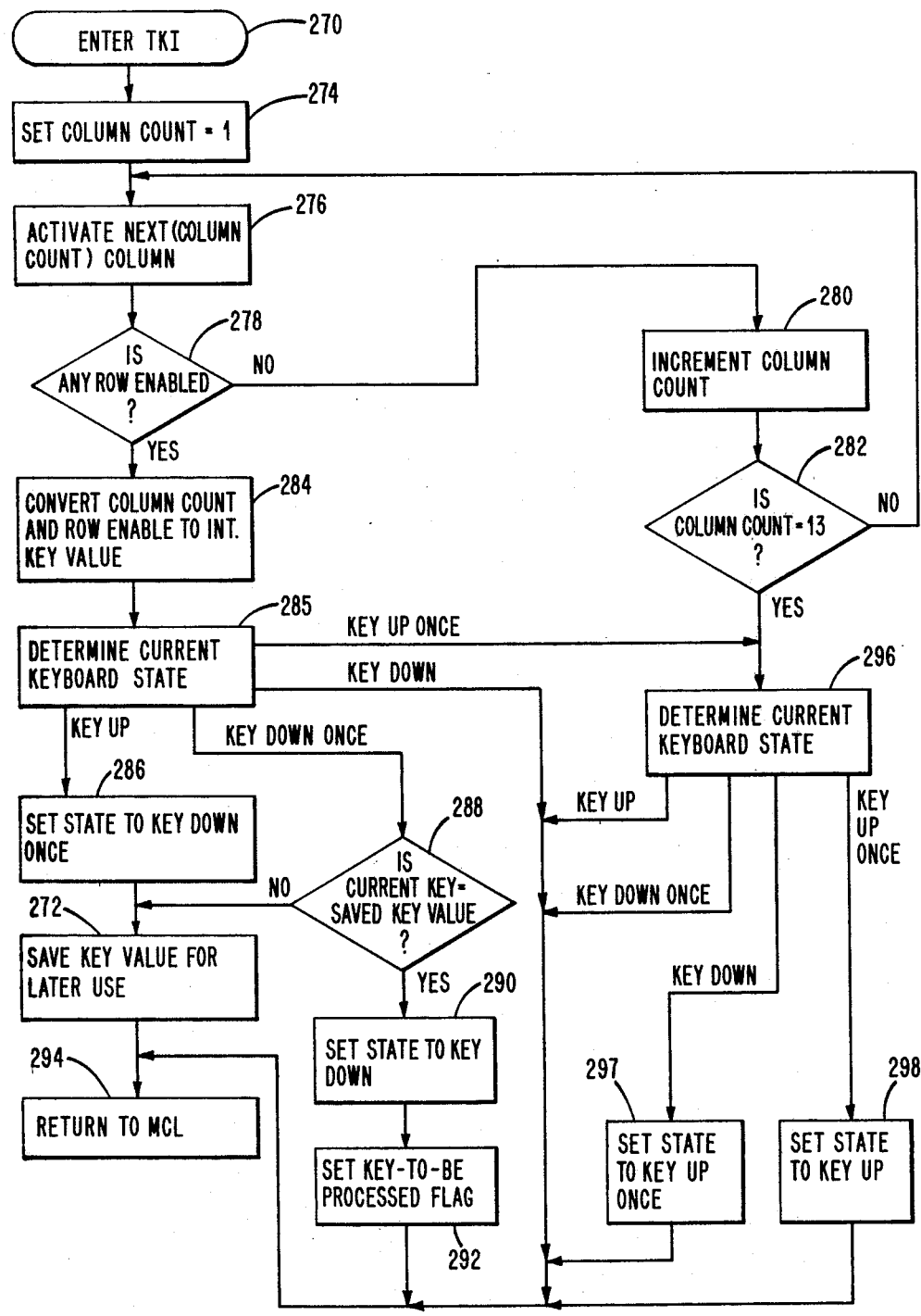
FIG. 10 is a flow diagram of the firmware for the test for new keyboard input routine of the controller of the present invention.

The Test for New Keyboard Input routine (TKI) is shown entered at block 270 of FIG. 10. This routine is responsible for reading the operator input from the keyboard. To accomplish this, this routine will follow the procedure discussed with respect to the keyboard hereinafter. This will lead to an identification of the key that is currently being depressed or an indication that no key is currently down. This routine will convert the key value into an internal representation and save it in a temporary byte (block 272). This routine will perform the function of de-bouncing the input keys. This means that no processing will proceed until the key can be guaranteed to be down. This is accomplished by maintaining a status indicator which defines the current state of the keyboard. The 4 states that a key may be in are: Key Up, Key Down Once, Key Down, Key Up Once.

Key Up means that all of the keys are currently up and that the keyboard is in its neutral position. Key Down Once means that this is the first time through this routine that we detected a key down. This state is entered from the Key Up state when a key is sensed as down. In addition to the state transition, the value (internal representation) is saved in a temporary data byte. This state is also maintained when a key is sensed down which has a different value than the one saved previously. The new key value replaces the previous one and the state is maintained as Key Down Once. Key Down means that the routine has sensed the same key down for two invocations and thus is prepared to process the key. This state is entered from the Key Down Once state when a key is sensed as down which has the same value as that saved in the temporary data byte. This state is left when this routine senses no key currently depressed. Key Up Once means that we were in the Key Down state and no key depressed was detected. When this routine finds no key depressed in the Key Up Once state, the Key Up state is entered. The TKI routine will cause a key processing routine to be dispatched when the Key Down state is entered. The value of the depressed key is passed to the Main Control Loop routine (MCL) so that it may invoke the proper keyboard processing routine.

More particularly, after entering the TKI routine, the column count is set equal to one (block 274) following which the column (next column) indicated by the column count is activated (block 276). The question is then asked (block 278) as to whether any row is enabled by the depression of an appropriate key on the keyboard. If the answer is NO, then the column count is incremented (block 280) following which a determination is made as to whether or not all twelve columns have been activated (block 282) and, if not, reentry is made to block 276.

If a row was enabled, block 284 is entered and a conversion is made of the column count and the row enabled to an internal key value. A determination is then made as to the current keyboard state (block 285). If it is Key Up, the Key Down Once state is set (block 286). If Key Down Once, then a determination is made as to whether the current key is equal to the previously saved key value (block 288), and if not, block 272 is entered. If equal, then the Key Down state is set (block 290) following which a key-to-be-processed flag is set (block 292) for use by the appropriate key processing routine entered by means of the MCL which is returned to (block 294). Block 294 is also entered if the state so determined is Key Down. If the Key Up Once state is determined by block 285, block 296 is entered and a determination is again made as to the current keyboard state. If Key Up or Key Down Once, return is made to the MCL. If Key Down, the Key Up Once state is set (block 297) and return is made to the MCL. If Key Up Once, the Key Up State is set (block 298) and return is made to the MCL.

Figure 11:
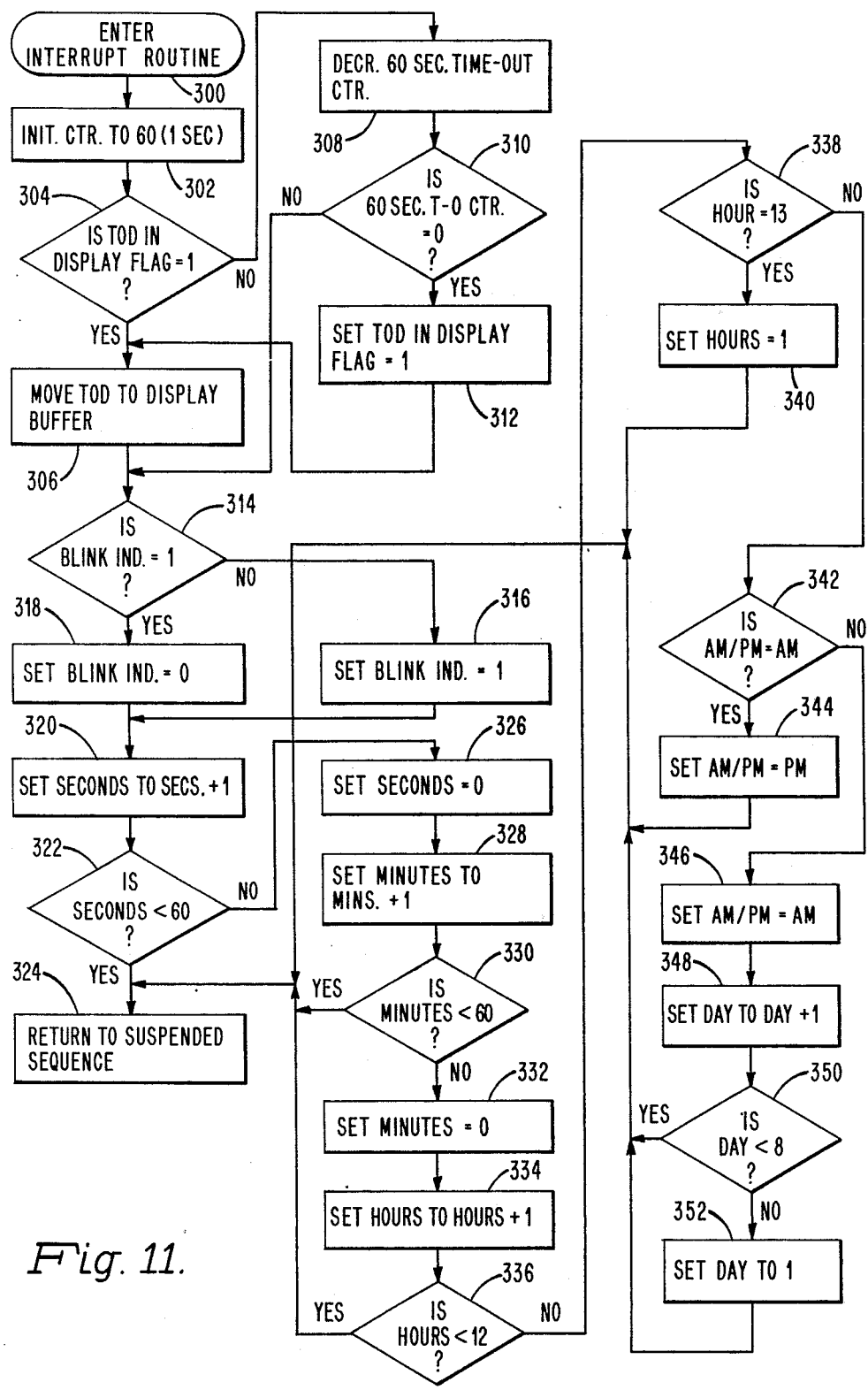
FIG. 11 is a flow diagram of the firmware of the interrupt routine of the controller of the present invention.

The Interrupt routine shown in FIG. 11 is executed every second. This routine is entered at block 300. Once the MPU counter has been initialized (block 302), it will count 60 cycles of the 60 cycle line and then generate an interrupt, once every second. This will cause the MPU to suspend the sequence that it is currently executing and temporarily commence executing the interrupt sequence. When this sequence has completed, the MPU will resume the sequence that was suspended. The sequence that was suspended will not be altered in any way as a result of the interrupt. During the interrupt sequence, the counter is reinitialized to count another 60 cycles. The time-of-day (T-O-D) in display flag is examined (block 304). If it is a 1, then the current time-of-day is moved into the display buffer (block 306). This will insure that the current time is being displayed. If the answer to block 304 is NO, then the controlled apparatus of the present invention is being used by the operator and some other information is in the display. However, the 60 second time-out counter is decremented (block 308), and if it reaches 0 (block 310), then the time-of-day in display flag is changed to a 1 (block 312) and the time of day is moved into the display buffer (block 306). The final purpose of the Interrupt routine is to update the time-of-day buffer. In addition, the blink indicator is reversed. The blink indicator will cause the colon between the hours and minutes of the time-of-day to alternate between illuminated and dark. This alternation will take plate at 1 second intervals so that the colon will be lighted for 1 second and then dark for 1 second (blocks 314, 316, and 318).

The time-of-day buffer is updated in stages. First, the second byte is incremented by 1 (block 320). If the new value is less than 60 (block 322), the interrupt is complete and the suspended sequence is resumed (block 324). If the seconds byte has reached 60 seconds, it is reset to 0 (block 326) and the minutes byte is incremented by 1 (block 328). If the new minutes value is less than 60 (block 330), a return is made to the suspended sequence (block 324). If the minutes byte has reached 60 minutes, it is reset to 0 (block 332) and the hours byte is incremented by 1 (block 324). If the hours byte is less than 12 (block 336), a return is made to the suspended sequence. If the hours byte is 13 (block 338) it is reset to 1 (block 340) and return is made to the suspended sequence. If the hours byte is 12 (NO answer from block 336 and a NO answer from block 338), then the AM/PM byte is examined (block 342). If the AM/PM byte indicates AM, it is set to PM (block 344) and a return is made to the suspended sequence. If it indicates PM, it is set to AM (block 346) and the day byte is incremented by 1 (block 248). If the day byte is less than 8 (block 350), a return is made to the suspended sequence. If the day byte is 8, it is set to 1 (block 352) and return is made to the suspended sequence.

As discussed hereinbefore, appropriate keyboard processing routines are executed in response to the depression of the appropriate keys. Such keyboard processing routines are under control of the Main Control Loop routine (MCL). Each keyboard processing routine will perform its specified function and then returns control to the MCL. The operation of such keyboard processing routines are shown by the following flow listings. A description of each of the flow listings follows. Keyboard Processing Routines

| | | |
|---|---|---|
| 1. | DAY | |
| 1.1 | set DAY in display to 0 | |
| 1.2 | set day-expected flag to 1 | |
| 1.3 | set review-not-initialized flag to 1 | |
| 1.4 | return to MCL | |
| 2. | START | |
| 2.1 | is day-expected = 1? | yes = 2.8, no = 2.2 |
| 2.2 | set START field of display to blank | |
| 2.3 | set right-hand digit of hour field to 0 | |
| 2.4 | set hour-expected flag to point to right-hand digit of START hour | |
| 2.5 | set minute-expected flag to point to right-hand digit of START minute | |
| 2.6 | set AM/PM-expected flag to point to AM/PM of START | |
| 2.7 | return to MCL | |
| 2.8 | set error light and return to MCL | |
| 3. | STOP | |
| 3.1 | is day-expected = 1? | yes = 3.8, no = 3.2 |
| 3.2 | set STOP field of display to blank | |
| 3.3 | set right-hand digit of hour field to 0 | |
| 3.4 | set hour-expected flag to point to right-hand digit of STOP hour | |
| 3.5 | set minute-expected flag to point to right-hand digit of STOP minute | |
| 3.6 | set AM/PM-expected flag to point to AM/PM of STOP | |
| 3.7 | return to MCL | |
| 3.8 | set error light and return to MCL | |
| 4. | UNLOCK KEYBOARD | |
| 4.1 | set combination-expected flag to 1 | |
| 4.2 | set digit-number-expected to 1 | |
| 4.3 | return to MCL | |
| 5. | DIGIT 0-9, MON.-SUN. | |
| 5.1 | is day-expected flag = 1? | yes = 5.6, no = 5.2 |
| 5.2 | is combination-expected flag = 1? | yes = 5.9, no = 5.3 |
| 5.3 | is hour-expected flag = 0? | yes = 5.4, no = 5.15 |
| 5.4 | is minute-expected flag = 0? | yes = 5.5, no = 5.17 |
| 5.5 | set error light and return to MCL | |
| 5.6 | is 1 ≦ DAY ≦ 7? | yes = 5.7, no = 5.5 |
| 5.7 | insert converted DAY into Display Buffer, reset day-expected flag to 0 | |

-continued

| | | |
|---|---|---|
| 5.8 | return to MCL | |
| 5.9 | read code switch (digit-number-expected) and compare to new digit | |
| 5.10 | are they the same? | yes = 5.12, no = 5.11 |
| 5.11 | reset combination-expected flag (to 0) | go to 5.5 |
| 5.12 | is digit-number-expected = 4? | yes = 5.14, no = 5.13 |
| 5.13 | increment digit-number-expected | go to 5.8 |
| 5.14 | unlock keyboard | go to 5.8 |
| 5.15 | is right-hand digit in hour field = 0? | yes = 5.16, no = 5.17 |
| 5.16 | set right-hand digit to blank | go to 5.18 |
| 5.17 | move right-hand digit to left-hand digit position | |
| 5.18 | insert new digit into right-hand digit position | go to 5.8 |
| 6. | COLON (:) | |
| 6.1 | reset hour-expected flag (to 0) | |
| 6.2 | is minute-expected flag = 0? | yes = 6.3 no = 6.4 |
| 6.3 | set error light and return to MCL | |
| 6.4 | set minute field to 00 | |
| 6.5 | return to MCL | |
| 7. | AM | |
| 7.1 | is AM/PM-expected flag set (not 0)? | yes = 7.2, no = 7.7 |
| 7.2 | reset hour-expected flag (to 0) | |
| 7.3 | reset minute-expected flag (to 0) | |
| 7.4 | put AM into position specified by AM/PM-expected flag | |
| 7.5 | reset AM/PM-expected flag (to 0) | |
| 7.6 | return to MCL | |
| 7.7 | set error light and return to MCL | |
| 8. | PM | |
| 8.1 | is AM/PM-expected flag set (not 0)? | yes = 8.2, no = 8.7 |
| 8.2 | reset hour-expected flag (to 0) | |
| 8.3 | reset minute-expected flag (to 0) | |
| 8.4 | put PM into position specified by AM/PM-expected flag | |
| 8.5 | reset AM/PM-expected flag (to 0) | |
| 8.6 | return to MCL | |
| 8.7 | set error light and return to MCL | |
| 9. | LOCK KEYBOARD | |
| 9.1 | set keyboard locked status into display | |
| 9.2 | reset day-expected flag to 0 | |
| 9.3 | reset hour-expected flag to 0 | |
| 9.4 | reset minute-expected flag to 0 | |
| 9.5 | reset AM/PM-expected flag to 0 | |
| 9.6 | reset combination-expected flag to 0 | |
| 9.7 | return to MCL | |
| 10. | SET TIME | |
| 10.1 | convert display buffer to time-of-day buffer | |
| 10.2 | return to MCL | |
| 11. | DISPLAY TIME | |
| 11.1 | move time-of-day to display buffer | |
| 11.2 | set time-of-day-in-display flag to 1 | |
| 11.3 | return to MCL | |
| 12. | CLEAR ERROR | |
| 12.1 | turn error light off | |
| 12.2 | return to MCL | |
| 13. | BEGIN PROGRAM | |
| 13.1 | set program flag to on | |
| 13.2 | return to MCL | |
| 14. | END PROGRAM | |
| 14.1 | set program flag to off | |
| 14.2 | return to MCL | |
| 15. | CLEAR MEMORY | |
| 15.1 | set each of the 42 BIT MAP bytes to 0 | |
| 15.2 | return to MCL | |
| 16. | CLEAR DAY | |
| 16.1 | set each of the 6 BIT MAP bytes for the current day to 0 | |
| 16.2 | return to MCL | |
| 17. | STORE | |
| 17.1 | convert STOP to internal and save | |
| 17.2 | is STOP = 0 or 30? | yes = 17.4, no = 17.3 |
| 17.3 | set STOP internal to next highest interval | |
| 17.4 | is STOP time 12:00 AM? | yes = 17.5, no = 17.6 |
| 17.5 | advance STOP internal to next day | |
| 17.6 | convert START to internal | |
| 17.7 | is START < STOP? | yes = 17.9, no = 17.8 |
| 17.8 | set error light and return to MCL | |
| 17.9 | move START time to temporary time of day (tod) buffer | |

-continued

| | | |
|---|---|---|
| 17.10 | set BIT MAP corresponding to temp tod to 1 | |
| 17.11 | increment temp tod by 30 minutes | |
| 17.12 | is temp tod = STOP time? | yes = 17.13, no = 17.10 |
| 17.13 | return to MCL | |
| 18. | REVIEW | |
| 18.1 | is review-not-initialized flag set? | yes = 18.2, no = 18.4 |
| 18.2 | reset review-not-initialized flag (to 0) | |
| 18.3 | set temp tod to 12:00 AM | |
| 18.4 | use temp tod as a pointer into BIT MAP, search for the first 1 bit, if 12:00 AM is reached, blank the displays and return | |
| 18.5 | move temp tod to START display buffer | |
| 18.6 | use temp tod as a pointer into BIT MAP, search for the first 0 bit, if 12:00 AM is reached, stop | |
| 18.7 | move temp tod to STOP display buffer | |
| 18.8 | return to MCL | |

Keyboard processing routines 1 (DAY) through 8 (PM) all cause the display to be modified by selecting a portion of the display and then modifying it. They all deal with a set of pointers kept in temporary bytes. These pointers identify the interpretation of the digit keys (0-9) that will follow. For example the value in one of the pointers will determine if the next number that is entered will be considered to be part of the combination to unlock the controller of the present invention.

The DAY routine (1) will set the day portion of the display to blank and then the day-expected flag to 1 to indicate that a digit entered should be considered a value to be put into the day display portion of the buffer. In addition, the review-flag is set to its non-initialized state (see REVIEW key description). Finally, return is taken to the MCL.

The START routine (2) will first test to see if the day-expected flag is set. If it is, the error light will be lit and return taken to the MCL. Otherwise, the START field of the dislay will be set to blanks and then the right-hand digit of the hours field will be set to display a 0. Also, the hour-expected flag is set to point to the right-hand digit of the START minute field. The AM/PM-expected flag is set to point to the AM/PM portion of the START display field. Finally, return is taken to the MCL.

The STOP routine (3) will first test to see if the day-expected flag is set. If it is, the error light will be illuminated and return taken to the MCL. Otherwise, the STOP field of the display will be set to blanks and then the right-hand digit of the hours field will be set to display a 0. Also, the hour-expected flag is set to point to the right-hand digit of the STOP hour field of the display. In addition, the minute-expected flag is set to point to the right-hand digit of the STOP minute field. The AM/PM-expected flag is set to point to the AM/PM portion of the STOP display field. Finally, return is taken to the MCL.

The UNLOCK KEYBOARD routine (4) will precondition the Digit routine so that the combination which will unlock the keyboard may be entered. To accomplish this, the UNLOCK KEYBOARD routine will set the combination-expected flag to 1 and reset the digit-number-expected to 1. Finally, return is taken to the MCL.

There is one common routine for handling all of the processing when a digit key is depressed. This Digit routine (5) will use the various pointers to decide which field of the display (when appropriate) will receive the new digit. The first flag to be examined is the day-expected flag. If the flag is set, a test is made to determine if the new key input is between the values of 1 and 7 inclusive. If not, an error is indicated. Otherwise, the value is used to obtain the proper segment enable which will illuminate the indicated day and this value is inserted into the display buffer in the day position. The day-expected flag is also reset to zero. Then, return is taken to the MCL. When the day-expected flag is not set, the combination-expected flag is examined. If such flag is set, the digit-number-expected flag is used to determine which switch (of the 4 shown in FIG. 2) is to be used for comparison. The chosen switch is compared to the key being processed. If they do not match, then an error has been encountered in entering the combination. This results in the combination-expected flag being reset, the error light being lit, and return taken to the MCL. If the switch and the key match, then the digit-number-expected flag is tested to see if the last key has been processed. If not, then the routine increments the digit-number-expected flag and returns to the MCL. If the last key has been processed, the routine resets the keyboard locked flag and returns to the MCL.

When the combination-expected flag is not set, the hour-expected flag is examined. If the flag is set, the key being depressed is to be the new right-hand digit in the hour field. This is done by first moving the current right-hand digit to the left to become the new left-hand digit. If the digit so moved is 0, instead of moving a 0, a blank is inserted into the left-hand digit. Then the new key value is inserted as the new right-hand digit. Finally, return is taken to the MCL. When the hour-expected flag is not set, the minute-expected flag is examined. If the flag is set, the key being depressed is to be the new right-hand digit in the minute field. This is done by first moving the current right-hand digit to the left to become the new left-hand digit. Then the new key value is inserted as the new right-hand digit. Finally, return is taken to the MCL. Thereafter, if none of the expected flags are set, the key is ignored and return is taken to the MCL.

The Colon (:) routine (6) will reset the hour-expected flag to zero. The minute-expected flag is then tested. If it isn't set, an error is indicated. If it is set, then this routine will cause further digit keys to be considered as part of the minutes field. In addition, this routine will move 0's into the minutes field as specified by the minutes-expected flag. Finally, return is taken to the MCL.

The AM routine (7) will first test the AM/FM-expected flag. If it isn't set, an error is indicated. If set, the value of AM is inserted into the location specified by the AM/PM-expected flag and three of the time related digit expected flags are reset. Thus the hour-expected, minute-expected, and the AM/FM-expected flags are all reset.

The PM routine (8) will first test the AM/FM-expected flag. If it isn't set, an error is indicated. If set, the value of PM is inserted into the location specified by the AM/PM-expected flag and three of the time related digit expected flags are reset. Thus the hour-expected, minute-expected, and the AM/PM-expected flags are all reset.

The LOCK KEYBOARD routine (9) will set the keyboard status to locked and reset all four time-related digit-expected flags. Thus, day-expected, hour-expected, minute-expected, and AM/PM-expected flags are all reset. Also, the combination-expected flag is set to zero. Then, return is taken to the MCL.

The SET TIME routine (10) will move the START field of the dislay buffer to the time-of-day buffer. Then, return is taken to the MCL. The DISPLAY TIME routine (11) will move the current time-of-day to the display buffer and set the time-of-day in display flag to 1. Finally, return is taken to the MCL. The CLEAR ERROR routine (12) will reset the error light and return to the MCL. The BEGIN PROGRAM routine (13) will set the program flag to on (1) and return to the MCL. The END PROGRAM routine (14) will set the program flag to off (0) and return to the MCL. The CLEAR MEMORY routine (15) will set each of the 42 bytes which represent the Bit-Map to 0 and return to the MCL. The CLEAR DAY routine (16) will set each of the 6 bytes in the Bit-Map associated with the current day to 0 and return to the MCL.

The STORE routine (17) allows the operator to enter new information into the Bit-Map. The information that is inserted into the Bit-Map is the interval defined by the start and the stop times of the display. This interval is expanded if it is not on a 0 or 30 minute boundary. The STORE routine starts by converting the values in the stop display field into interval form and testing to see if the minute value is 00 or 30. If not 00 or 30, the interval value of the stop field is incremented to point to the next highest interval. Thus if the values in the minutes field is 1:15 AM, it will be converted so that the internal value represents 1:30 AM. Once this is done, the internal time is tested to see if it points to 12:00 AM (midnight). If it does, the interval value is set to point to the first value for the next day. Thus the internal vale to the stop time will point to that Bit-Map entry which corresponds to the half-hour interval beginning with the rounded-up stop time value. With the stop value converted, the START is converted (the conversion routine will round the start time down to the nearest lower half-hour interval) and a test is performed to insure that the start value is less than the stop value. If this is not true, an error is indicated. The Bit-Map value corresponding to the start value is set to 1 (to indicate connected devices on). The start valve is incremented by 30 minutes and tested against the stop value. If the new value is less than the stop value, the routine continues setting the proper bits in the Bit-Map. When the new value reaches the stop value, return is taken to the MCL. Thus, the bit in the Bit-Map corresponding to the start time is a 1 as are such bits thereafter until the stop time is reached.

The REVIEW routine (18) is used to recall the entries that have been programmed for a given day. When the routine starts it tests if it has been initialized. The initialized flag is reset by the DAY routine to indicate that any successive REVIEW will require initialization. After the REVIEW routine has performed the initialization needed, the initialized flag will be set so that further activations of the review key will retrieve succeeding intervals rather than commencing with 12:00 AM. The initialization consists of setting a temporary buffer to represent 12:00 AM of the current day (day as specified in the display buffer). This temporary buffer is used as a pointer and is made to sequence through all of the BIT-MAP values corresponding to the day in question. The value in this buffer is maintained until the review routine is again initialized. The buffer is used as a pointer into the Bit-Map and the next bit which is a 1 is searched for. If the temporary buffer reaches 12:00 AM, both START and STOP display buffer fields are set to blank. If a 1 is found, the value in the temporary buffer is moved to the START display field and the temporary buffer is used to find the next 0 in the Bit-Map. If the temporary buffer reaches 12:00 AM of the next day, the value is set to 12:00 AM. In any case, the temporary buffer is moved to the STOP field of the display buffer and return is made to the MCL.

As has been seen hereinbefore, a Bit-Map has been utilized to store on/off information by bit representations, with each bit representing a time interval of thirty minutes. It has been seen however that more or less than thirty minutes may have been so represented. An alternative embodiment to such Bit-Map is shown in FIG. 12. The memory table of FIG. 12 is used to store time range information by use of slot entries. As shown, there are included eight slots, however, by expanding the memory table, additional slots may be had. Each slot specifies a time period for the operation of the appliance under control. For each slot, there is an entry for each day of the week. FIG. 12 illustrates entries, by way of example, for day 3 (Wednesday). The designation (0,0) means that there is no entry. Thus, non-zero entries specify time periods for appliance operation. Thus, on Wednesday, the appliance will be on from 7:00 AM to 8:30 AM as shown for the entry in slot 3, and so on as shown for the entries in slots 5 and 7. As shown, slots are allotted for additional entries. However, such entries need not be made in a sequential manner by slot number. That is, an entry of (6:00 PM, 7:00 PM) may have been entered in any slot, for example, slot 1, and not necessarily slot 6.

It can be seen that various changes may be made to the controller of the present invention without departing from the spirit and scope thereof. For example, it can be seen that the Bit-Map may have a different organization or format of information. Further, the controller may have been programmed for operation for longer than a seven day period, for example, one month or even one year. The devices under control could have been operated independently, i.e., on a different programmed basis, by partially reproducing the controller of the present invention. That is, not all functions would have to be reproduced, e.g., the time of day generation logic. It can further be seen that the relay, which is controlled for applying power to the appliance, may have been included in the appliance itself with low power lines coupling the controller and the relay in the appliance. In fact, the controller may have been coupled to the appliance without wires, i.e., by remote control. The power cord for the appliance under control may have been locked in a different way, for example, by use of a lock plate without the need for hinging or, for example, by use of special AC sockets, in which case the controlled appliance would have a special AC socket which could not be plugged into a conventional AC wall socket. In fact, for applications which need not have a locked AC cord, such as, for example, for use in controlling lights for security purposes, a lock need not be used. It can further be seen that different types of logic may be used without departing from the invention and that the control words shown by the flow diagram and flow listings may be altered without departing from the scope of the invention.

Having described the invention, what is claimed as new and novel and for which it is desired to secure Letters Patent is:

1. Controller apparatus for controlling the operation of a device, said apparatus comprising:
    A. switch means having a control input, a source input and a source output;
    B. first means for coupling said source output to said device;
    C. second means for coupling an energy source to said source input;
    D. means for receiving a control signal at said control input, wherein the presence of said control signal at said control input enables the coupling of said energy source from said source input to said source output; and
    E. means for generating said control signal comprising
        1. means for providing the current time of day,
        2. storage means for storing information indicative of at least one period of time of a potential plurality of periods of time during which said control signal is to be generated, said storage means including a plurality of storage locations, each of said locations corresponding to a predetermined time interval, and wherein each of said periods of time is comprised of at least one of said predetermined time intervals,
        3. means for entering into said storage means information defining anyone of said periods of time, said information including the requirement for only a start time and a stop time for each of said periods of time, and
        4. means, responsive to said current time of day and said information stored in said storage means, for enabling the generation of said control signal.

2. Apparatus as in claim 1 wherein each of said storage locations corresponds to one bit of storage.

3. Apparatus as in claim 2 wherein each of said bits of storage represents thirty minutes.

4. Apparatus as in claim 1 wherein each of said predetermined time intervals is equal in duration and wherein the number of said locations corresponds to the number of said predetermined time intervals in a twenty-four hour interval.

5. Apparatus as in claim 1 wherein each of said predetermined time intervals is equal in duration and wherein the number of said locations corresponds to the number of said predetermined time intervals in a seven day interval.

6. Apparatus as in claim 1 wherein said energy source is an alternating current power source.

7. Apparatus as in claim 1 wherein said switch means includes a relay type unit.

8. Apparatus as in claim 1 wherein said switch means includes at least two relay type units, each of said relay type units having a separate one of said source outputs for connection to at least two of said devices.

9. Apparatus as in claim 8 wherein said devices are of different type.

10. Apparatus as in claim 1 wherein said device is a television type device.

11. Apparatus as in claim 1 wherein said means for entering comprises:
    A. keyboard means having a plurality of keys, including a start key, a stop key and a plurality of data keys;
    B. first means, responsive to the actuation of said start key followed by the actuation of some of said data keys, for storing said start time of one of said periods of time in said storage means; and
    C. second means, responsive to the actuation of said stop key followed by the actuation of some of said data keys, for storing said stop time of said one of said periods of time in said storage means, whereby said information indicative of said one of said periods of time is stored by means of said keyboard means.

12. Apparatus as in claim 11 wherein:
    A. said storage means includes a plurality of locations, each of said locations corresponding to a predetermined time interval, wherein the time between said start time and said stop time includes a plurality of said predetermined time intervals; and wherein said apparatus further comprises
    B. means, responsive to said first and second means for storing, for storing an indicia in each of said locations corresponding to said plurality of said predetermined time intervals between said start time and said stop time.

13. Apparatus as in claim 12 further comprising:
    A. means for incrementing said current time of day by a predetermined amount of time thereby providing a look-ahead current time of day;
    B. means for determining whether a said location corresponding to said look-ahead current time of day includes a said indicia; and
    C. means, responsive to said means for determining, for enabling said apparatus to couple, by means of said switch means, said energy source to said source output, thereby energizing said device earlier than the time indicated by said start time.

14. Apparatus as in claim 1 wherein said device includes a connector plug for connection to said energy source, and wherein said apparatus further comprises:
    A. receptacle means for receiving said connector plug of said device; and
    B. means for securing said connector plug to said receptacle means so that said plug may not be removed.

15. Apparatus as in claim 14 wherein said means for securing comprises:
    A. a cover plate for placement over said plug and said receptacle means; and
    B. means for locking said cover plate in placement over said plug and said receptacle means.

16. Apparatus as in claim 1 further comprising:
    A. means for setting a combination for use in preventing unauthorized use of said apparatus;

B. means for entering said combination each time said information in said storage means is to be changed; and C. means for disabling any change of said information in said storage means if said combination entered by said means for entering is not the same as said combination set by said means for setting.

17. Apparatus as in claim 16 further comprising means for securing said means for setting so that said combination is not available to unauthorized users of said apparatus.

18. Apparatus as in claim 17 wherein said device includes a connector plug for connection to said energy source, and wherein said apparatus further comprises:

A. receptacle means for receiving said connector plug of said device;

B. means for securing said connector plug to said receptacle means so that said plug may not be removed; and C. wherein said means for securing said connector plug and said means for securing said means for setting include
  1. a cover plate for placement over said plug, said receptacle means and said means for setting, and
  2. means for locking said cover plate in placement over said plug, said receptacle means and said means for setting.

19. Apparatus as in claim 1 further comprising:

A. means for displaying said information stored in said storage means; and

B. means, included in said means for displaying, for indicating the current time of day.

20. Apparatus as in claim 19 further comprising means for displaying said current time of day when said information is not displayed.

21. Apparatus as in claim 1 further comprising:

A. means for entering a signal indicating that one of said periods of time stored in said storage means be visually displayed; and B. means, responsive to said means for entering said signal, for displaying said one of said periods of time stored in said storage means.

22. Apparatus as in claim 21 wherein said storage means includes information indicative of a plurality of periods of time stored therein for a predetermined twenty-four hour period; and further comprising means, responsive to the enabling of said means for entering said signal, for enabling said means for displaying to display one of said periods of time for said predetermined twenty-four hour period.

23. Apparatus as in claim 22 further comprising means, responsive to the repeated enabling of said means for entering said signal, for enabling the successive display, by means of said means for displaying, of information indicative of each of the remaining ones of said periods of time for said predetermined twenty-four hour period.

24. Apparatus as in claim 1 wherein said storage means includes a plurality of storage locations, each of said locations corresponding to a predetermined time interval; and wherein each of said periods of time is comprised of at least one of said predetermined time intervals, each of said predetermined time intervals having a start point and a stop point, and further comprising:

A. means, responsive to said means for entering, for converting said start time to the start point of the one of said predetermined time intervals in which said start time is included;

B. means, responsive to said means for entering, for converting said stop time to the stop point of the one of said predetermined time intervals in which said stop time is included; and C. means for storing indicia of said start point and said stop point as respectively converted from said start time and said stop time in said storage means.

25. Apparatus as in claim 1 further comprising means for indicating the operational status of said apparatus and said device.

26. Controller apparatus for controlling the operation of a device, said apparatus comprising:

A. means for generating a control signal;

B. means for coupling said control signal for receipt by said device, wherein the presence of said control signal enables the operation of said device; and wherein C. said means for generating comprises
  1. means for providing the current time of day,
  2. storage means for storing information indicative of at least one period of time of a potential plurality of periods of time during which said control signal is to be generated, said storage means including a plurality of storage locations, each of said locations corresponding to a predetermined time interval, and wherein each of said periods of time comprises at least one of said predetermined time intervals,
  3. means for entering into said storage means information defining anyone of said periods of time, said information including the requirement for only a start time and a stop time for each of said periods of time, and
  4. means, responsive to said current time of day and said information stored in said storage means, for enabling the generation of said control signal.

27. Controller apparatus for controlling the operation of a device, said apparatus comprising:

A. means for generating a control signal;

B. means for coupling said control signal for receipt by said device, wherein the presence of said control signal enables the operation of said device; and wherein C. said means for generating comprises
  1. means for providing the current time of day,
  2. storage means for storing information indicative of at least one period of time of a potential plurality of periods of time during which said control signal is to be generated,
  3. means for entering into said storage means information defining anyone of said periods of time, said information including the requirement for only a start time and a stop time for each of said periods of time, and
  4. means, responsive to said current time of day and said information stored in said storage means, for enabling the generation of said control signal; and wherein D. said storage means includes a plurality of locations, each of said locations corresponding to a predetermined time interval, wherein the time between said start time and said stop time includes a plurality of said predetermined time intervals; and wherein said apparatus further comprises E. means, responsive to the entering into said storage means said start and stop times, for storing an indicia in each of said locations corresponding to said plurality of said predetermined time intervals between said start time and said stop time.

28. Controller apparatus for controlling the operation of a device, said apparatus comprising:
   A. means for generating a control signal;
   B. means for coupling said control signal for receipt by said device, wherein the presence of said control signal enables the operation of said device; and wherein
   C. said means for generating comprises
      1. means for providing the current time of day,
      2. storage means for storing information indicative of at least one period of time of a potential plurality of periods of time during which said control signal is to be generated, said storage means including a plurality of storage locations, each of said locations corresponding to a predetermined time interval, and wherein each of said periods of time comprises at least one of said predetermined time intervals, said information for each of said predetermined time intervals having either of two states, wherein a first said state indicates that said control signal is to be generated and wherein a second said state indicates that said control signal is not to be generated, and
      3. means, responsive to said current time of day and said information stored in said storage means, for enabling the generation of said control signal.

29. Apparatus as in claim 28 wherein said information for each of said predetermined time intervals comprises a single bit of information, said bit having said two states.

30. Controller apparatus for controlling the operation of a device, said apparatus comprising:
   A. means for generating a control signal;
   B. means for coupling said control signal for receipt by said device, wherein the presence of said control signal enables the operation of said device; wherein
   C. said means for generating comprises
      1. means for providing the current time of day,
      2. storage means for storing information indicative of at least one period of time of a potential plurality of periods of time during which said control signal is to be generated,
      3. means, responsive to said current time of day and said information stored in said storage means, for enabling the generation of said control signal, wherein said device includes a connector plug for connection to an energy source, and wherein said apparatus further comprises
   D. receptacle means for receiving said connector plug of said device; and
   E. means for securing said connector plug to said receptacle means so that said plug may not be removed, said means for securing comprising
      1. cover plate for placement over said plug and said receptacle means, and
      2. means for locking said cover plate in placement over said plug and said receptacle means.

31. Apparatus as in claim 30 further comprising means for entering into said storage means information defining anyone of said periods of time, said information including the requirement for only a start time and a stop time for each of said periods of time.

32. Apparatus as in claim 30 wherein said storage means includes a plurality of storage locations, each of said locations corresponding to a predetermined time interval, and wherein each of said periods of time comprises at least one of said predetermined time intervals.

33. Controller apparatus for controlling the operation of a device, said apparatus comprising:
   A. means for generating a control signal;
   B. means for coupling said control signal for receipt by said device, wherein the presence of said control signal enables the operation of said device; wherein
   C. said means for generating comprises
      1. means for providing the current time of day,
      2. storage means for storing information indicative of at least one period of time of a potential plurality of periods of time during which said control signal is to be generated, and
      3. means, responsive to said current time of day and said information stored in said storage means, for enabling the generation of said control signal;
   D. means for setting a combination for use in preventing unauthorized use of said apparatus;
   E. means for entering said combination each time said information in said storage means is to be changed; and
   F. means for disabling any change of said information in said storage means if said combination entered by said means for entering is not the same as said combination set by said means for setting.

34. Apparatus as in claim 33 further comprising means for securing said means for setting said combination from unauthorized use.

35. Apparatus as in claim 33 further comprising means for entering into said storage means information defining anyone of said periods of time, said information including the requirement for only a start time and a stop time for each of said periods of time.

36. Apparatus as in claim 33 wherein said storage means includes a plurality of storage locations, each of said locations corresponding to a predetermined time interval, and wherein each of said periods of time comprises at least one of said predetermined time intervals.

37. Controller apparatus for controlling the operation of a device, said apparatus comprising:
   A. means for generating a control signal;
   B. means for coupling said control signal for receipt by said device, wherein the presence of said control signal enables the operation of said device; wherein
   C. said means for generating comprises
      1. means for providing the current time of day,
      2. storage means for storing information indicative of at least one period of time of a potential plurality of periods of time during which said control signal is to be generated, and
      3. means, responsive to said current time of day and said information stored in said storage means, for enabling the generation of said control signal;
   D. means for entering a signal indicating that one of said periods of time stored in said storage means be visually displayed; and
   E. means, responsive to said means for entering, for displaying said one of said periods of time stored in said storage means.

38. Apparatus as in claim 37 further comprising means, responsive to the repeated enabling of said means for entering, for enabling the successive display, by means of said means for displaying, of information indicative of each of the other ones of said periods of time stored in said storage means.

39. Apparatus as in claim 38 further comprising means for entering into said storage means information defining anyone of said periods of time, said information including the requirement for only a start time and a stop time for each of said periods of time.

40. Apparatus as in claim 38 wherein said storage means includes a plurality of storage locations, each of said locations corresponding to a predetermined time interval, and wherein each of said periods of time comprises at least one of said predetermined time intervals.

41. Controller apparatus for controlling the operation of a device, said apparatus comprising:
   A. means for generating a control signal;
   B. means for coupling said control signal for receipt by said device, wherein the presence of said control signal enables the operation of said device; and wherein
   C. said means for generating comprises
      1. means for providing the current time of day,
      2. storage means for storing information indicative of at least one period of time of a potential plurality of periods of time during which said control signal is to be generated, said storage means including a plurality of storage locations, each of said locations corresponding to a predetermined time interval, and wherein each of said periods of time comprises at least one of said predetermined time intervals, and
      3. means, responsive to said current time of day and said information stored in said storage means, for enabling the generation of said control signal;
   D. means for placing said device either by a normal mode or a control mode, said normal mode enabling the operation of said device independent of said information stored in said storage means and said control mode enabling the operation of said device subject to said information stored in said storage means, and
   E. means for enabling the operation of said device under the control of said apparatus and subject to said information stored in said storage means after switching, in response to said means for placing, from said normal mode to said control mode.

42. Apparatus as in claim 41 further comprising means for entering into said storage means information defining anyone of said periods of time, and information including the requirement for only a start time and a stop time for each of said periods of time.

43. Controller apparatus for controlling the operation of a device, said apparatus comprising:
   A. switch means having a control input, a source input and a source output;
   B. first means for coupling said source output to said device;
   C. second means for coupling an energy source to said source input;
   D. means for receiving a control signal at said control input, wherein the presence of said control signal at said control input enables the coupling of said energy source from said source input to said source output; and
   E. means for generating said control signal comprising:
      1. means for providing the current time of day,
      2. storage means for storing information indicative of at least one period of time of a potential plurality of periods of time during which said control signal is to be generated, said storage means including a plurality of storage locations, said plurality of locations including a plurality of groups of locations, each of said groups of locations for storing said information indicative of different ones of said periods of time,
      3. means for entering into said storage means information defining anyone of said periods of time, said information including the requirement for only a start time and a stop time for each of said periods of time, and
      4. means, responsive to said current time of day and said information stored in said storage means, for enabling the generation of said control signal.

44. Apparatus as in claim 43 wherein each day of a seven day interval includes a subplurality of said groups of said locations.

* * * * *